United States Patent
Yu et al.

(10) Patent No.: US 11,474,187 B2
(45) Date of Patent: Oct. 18, 2022

(54) POSITIONING METHOD BASED ON 5G AND POSITIONING SYSTEM BASED ON 5G

(71) Applicant: CHINA UNIONPAY CO., LTD., Shanghai (CN)

(72) Inventors: Weiqi Yu, Shanghai (CN); Sishuang Wan, Shanghai (CN); Xiaoyun Wang, Shanghai (CN); Guobao Liu, Shanghai (CN); Yue Jin, Shanghai (CN); Yinhe Lan, Shanghai (CN)

(73) Assignee: CHINA UNIONPAY CO., LTD., Shanghai (CN)

(*) Notice: Subject to any disclaimer, the term of this patent is extended or adjusted under 35 U.S.C. 154(b) by 0 days.

(21) Appl. No.: 17/419,075

(22) PCT Filed: Jul. 8, 2019

(86) PCT No.: PCT/CN2019/094979
§ 371 (c)(1),
(2) Date: Jun. 28, 2021

(87) PCT Pub. No.: WO2020/134015
PCT Pub. Date: Jul. 2, 2020

(65) Prior Publication Data
US 2022/0043098 A1 Feb. 10, 2022

(30) Foreign Application Priority Data
Dec. 29, 2018 (CN) .......................... 201811638941.2

(51) Int. Cl.
*G01S 5/02* (2010.01)
*H04W 4/024* (2018.01)
*H04W 4/029* (2018.01)
*G01C 21/34* (2006.01)
(Continued)

(52) U.S. Cl.
CPC .......... *G01S 5/021* (2013.01); *G01C 21/3407* (2013.01); *G01C 21/3679* (2013.01);
(Continued)

(58) Field of Classification Search
CPC ...... G01S 5/021; G01S 5/0236; H04W 4/024; H04W 4/029; H04W 4/023; G01C 21/3407; G01C 21/3679
See application file for complete search history.

(56) References Cited

U.S. PATENT DOCUMENTS

| 10,176,596 B1* | 1/2019 | Mou ........................ G01S 17/89 |
| 2007/0072623 A1* | 3/2007 | Shyr ........................ G01S 19/09 |
| | | 455/456.1 |

(Continued)

FOREIGN PATENT DOCUMENTS

| CN | 1942008 A | 4/2007 |
| CN | 102325176 A | 1/2012 |

(Continued)

OTHER PUBLICATIONS

International Search Report dated Sep. 27, 2019 issued in PCT/CN2019/094979.
Written Opinion dated Sep. 27, 2019 issued in PCT/CN2019/094979.

*Primary Examiner* — Peter D Nolan
*Assistant Examiner* — Wae L Louie
(74) *Attorney, Agent, or Firm* — Scully Scott Murphy & Presser

(57) ABSTRACT

A positioning method comprises acquiring positioning information of a 5G base station from a satellite, obtaining calibration information based on the positioning information, and broadcasting outwards the calibration information; acquiring initial positioning information of a user terminal from the satellite; accessing a nearest 5G base station in real time, monitoring and acquiring calibration information broadcasted by the nearest 5G base station; and calibrating the initial positioning information acquired in the initial positioning step according to the calibration information acquired in the monitoring step to obtain positioning result (Continued)

information. As described above, the positioning of centimeter level precision can be realized by utilizing the 5G base station, and there is no need to additionally establish a CORS base station and a data center, thereby the cost of precise positioning can be reduced.

8 Claims, 3 Drawing Sheets

(51) Int. Cl.
    *G01C 21/36*    (2006.01)
    *G01S 5/00*     (2006.01)
    *H04W 4/02*     (2018.01)
    *H04W 84/04*    (2009.01)
    *H04W 88/08*    (2009.01)

(52) U.S. Cl.
    CPC .......... *G01S 5/0045* (2013.01); *G01S 5/0236* (2013.01); *H04W 4/023* (2013.01); *H04W 4/024* (2018.02); *H04W 4/029* (2018.02); *H04W 84/042* (2013.01); *H04W 88/08* (2013.01)

(56) References Cited

U.S. PATENT DOCUMENTS

| | | | |
|---|---|---|---|
| 2017/0220876 A1* | 8/2017 | Gao | G06V 10/255 |
| 2017/0332192 A1* | 11/2017 | Edge | G01S 5/0036 |
| 2017/0332208 A1* | 11/2017 | Cardoso de Moura | H04W 24/08 |
| 2018/0095475 A1* | 4/2018 | Minster | G06T 11/60 |
| 2018/0192233 A1* | 7/2018 | Del Regno | G01S 19/071 |
| 2018/0247544 A1* | 8/2018 | Mustafic | H04W 48/04 |
| 2018/0248613 A1* | 8/2018 | Peitzer | H04B 17/12 |
| 2019/0349316 A1* | 11/2019 | Yuan | H04L 49/208 |
| 2020/0398692 A1* | 12/2020 | Zu | B60L 53/665 |
| 2021/0328714 A1* | 10/2021 | Wang | H04L 9/304 |

FOREIGN PATENT DOCUMENTS

| | | |
|---|---|---|
| CN | 102426374 A | 4/2012 |
| CN | 103134480 A | 6/2013 |
| CN | 104661307 A | 5/2015 |
| CN | 104754729 A | 7/2015 |
| CN | 104765043 A | 7/2015 |
| CN | 104796982 A | 7/2015 |
| CN | 106226796 A | 12/2016 |
| CN | 106352886 A | 1/2017 |
| CN | 106643753 A | 5/2017 |
| CN | 107292459 A | 10/2017 |
| CN | 108702726 A | 10/2018 |
| CN | 108848442 A | 11/2018 |
| CN | 108955710 A | 12/2018 |
| CN | 108957396 A | 12/2018 |
| CN | 109196925 A | 1/2019 |
| KR | 20060010134 A | 2/2006 |

* cited by examiner

POSITIONING METHOD BASED ON 5G AND POSITIONING SYSTEM BASED ON 5G

CROSS-REFERENCES

This application is a national application of PCT/CN2019/094979 filed on Jul. 8, 2019, and claims priority to and the benefit of Chinese Patent Application No. 201811638941.2 filed on Dec. 29, 2018. The afore-mentioned patent applications are hereby incorporated by reference in their entireties for all purposes.

FIELD OF THE INVENTION

This application relates to communication technology.

BACKGROUND

FIG. 1 is a schematic diagram representing a conventional positioning method.

As shown in FIG. 1, the existing precise positioning solution is assisted by calibration through additionally installing a number of CORS (Continuously Operating Reference Stations) base stations to achieve a centimeter level positioning. As shown in FIG. 1, the positioning procedure is as follows:

as a preparation step, the CORS base station acquires in advance positioning information from the satellite in real time.

Step S1: a terminal 10 acquires positioning from a satellite 20;

Step S2: the terminal 10 sends positioning information to a data center 30;

Step S3: the data center 30 finds out the nearest CORS base station 1 according to the positioning information and CORS base station distribution information, and sends a request to the CORS base station 1;

Step S4: after the CORS base station 1 receives the request, the processed real-time calibration information (including pseudo-range and phase information, station coordinates, station movement rate vectors, GPS (Global Positioning System) ephemeris, weather data around the station) is returned to the data center 30;

Step S5: the data center 30 processes the data to obtain calibration information and returns the information to the terminal 10;

Step S6: the terminal 10 calibrates the positioning according to the calibration information.

The information disclosed in the background section of the description is intended merely to enhance the understanding of the overall background of the description and should not be taken as an admission or implication in any form that such information constitutes conventional means known to those of ordinary skill in the art.

SUMMARY

In view of the above issues, the present application is intended to present a positioning method based on 5G and a positioning system based on 5G.

The positioning method based on 5G of one aspect of the present invention is implemented by a 5G base station, a satellite and a user terminal, the method comprises:
a broadcasting step of acquiring positioning information of the 5G base station from the satellite by the 5G base station, obtaining calibration information based on the positioning information, and broadcasting outwards the calibration information by the 5G base station;
an initial positioning step of acquiring initial positioning information of the user terminal from the satellite by the user terminal;
a monitoring step of accessing a nearest 5G base station in real time, monitoring and acquiring calibration information broadcasted by the nearest 5G base station by the user terminal; and
a calibration step of calibrating the initial positioning information acquired in the initial positioning step according to the calibration information acquired in the monitoring step by the user terminal to obtain positioning result information.

The positioning system of a positioning method based on 5G of one aspect of the present invention comprises:
a satellite for providing positioning services;
a 5G base station for obtaining positioning information from the satellite in real time and obtaining calibration information based on the positioning information, and broadcasting outwards the calibration information;
a user terminal for acquiring initial positioning information of the user terminal from the satellite, and for acquiring calibration information broadcasted by the 5G base station, and calibrating the initial positioning information according to the calibration information to obtain positioning result information.

The vehicle refueling/charging method based on 5G positioning of one aspect of the present invention comprises:
a first positioning step of obtaining vehicle position information based on 5G positioning by a vehicle control system;
a first navigation position obtaining step of sending the vehicle positioning information to a positioning server by the vehicle control system, and sending the position of a nearest gas station/charging station to the vehicle control system according to the vehicle positioning information by the positioning server;
a first navigation step of positioning to the location of the nearest gas station/charging station according to the navigation by the vehicle control system;
a second positioning step of obtaining the position information of an empty and the nearest refueling port/charging pile in the nearest gas station/charging station based on 5G positioning by the vehicle control system;
a second navigation step of navigating the vehicle to the nearest refueling port/charging pile according to the position information of the refueling port/charging pile by the vehicle control system, and achieving matching of the vehicle and the refueling terminal/charging pile;
a refueling/charging step of achieving refueling/charging at the nearest refueling port/charging pile by the vehicle.

The computer readable medium of one aspect of the present invention has stored thereon a computer program, the computer program, when executed by a processor, implements the positioning method based on 5G as described above.

The computer device of one aspect of the present invention comprises a memory, a processor, and a computer program stored on the memory and executable on the processor, wherein the processor, when executing the computer program, implements the positioning method based on 5G as described above.

Other features and advantages of the methods and apparatus of the present invention will specifically become apparent or elucidated by the accompanying drawings incorporated herein and the following detailed description along with the accompanying drawings to illustrate certain principles of the present invention.

DETAILED DESCRIPTION

Some of the various embodiments of the invention are introduced in the following and are intended to provide a basic understanding of the invention. It is not intended to identify key or critical elements of the invention or to define the scope to be protected.

First, a simple illustration is made for 5G communication.

5G is the fifth generation communication technology, mainly characterized in millimeter level wavelength, ultra wide band, ultra high speed and ultra low latency. If a high frequency band is used for mobile communication, the maximum problem is that the transmission distance is greatly shortened, and the coverage capacity is greatly reduced. Therefore, in the 5G communication, to cover the same area, the number of 5G base stations that need to be establish will greatly exceed the number of base stations for 4G communication.

Figure 1:
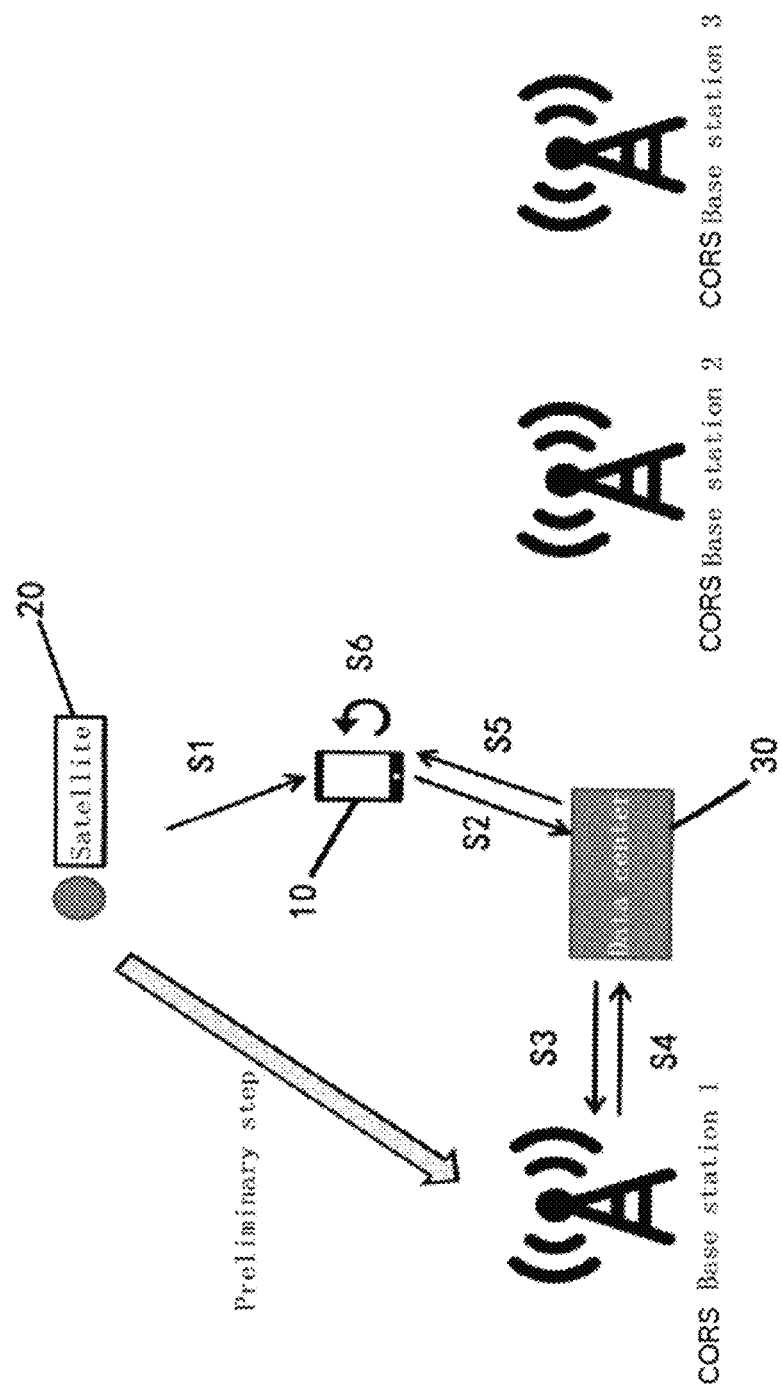
FIG. 1 is a schematic diagram representing a conventional positioning method.
Figure 2:
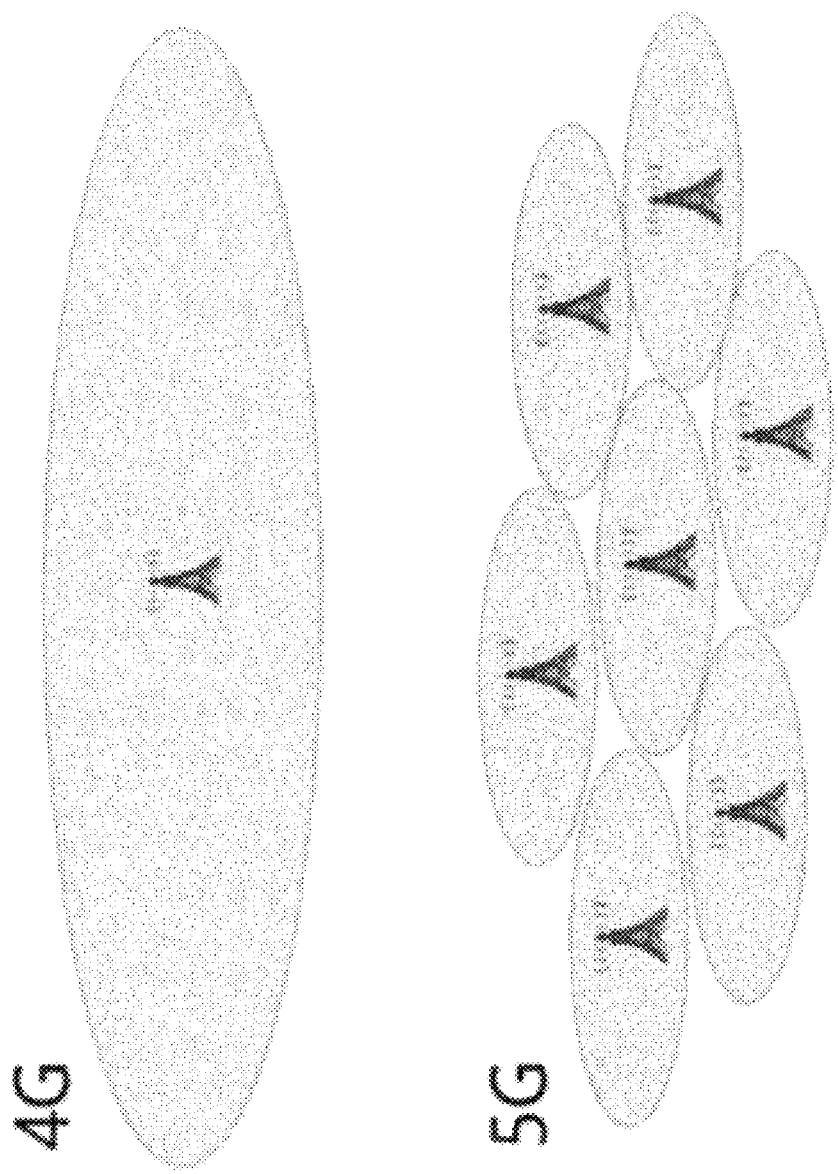
FIG. 2 is a schematic diagram representing the distribution condition of a 4G communication base station and 5G communication base stations.

FIG. 2 is a schematic diagram representing the distribution condition of a 4G communication base station and 5G communication base stations. As shown in FIG. 2, in 5G communication, the base station distribution is ultra dense as compared to 4G communication. In an embodiment of the present invention described below, the characteristic of ultra dense distribution of 5G communication base stations is utilized.

Figure 3:
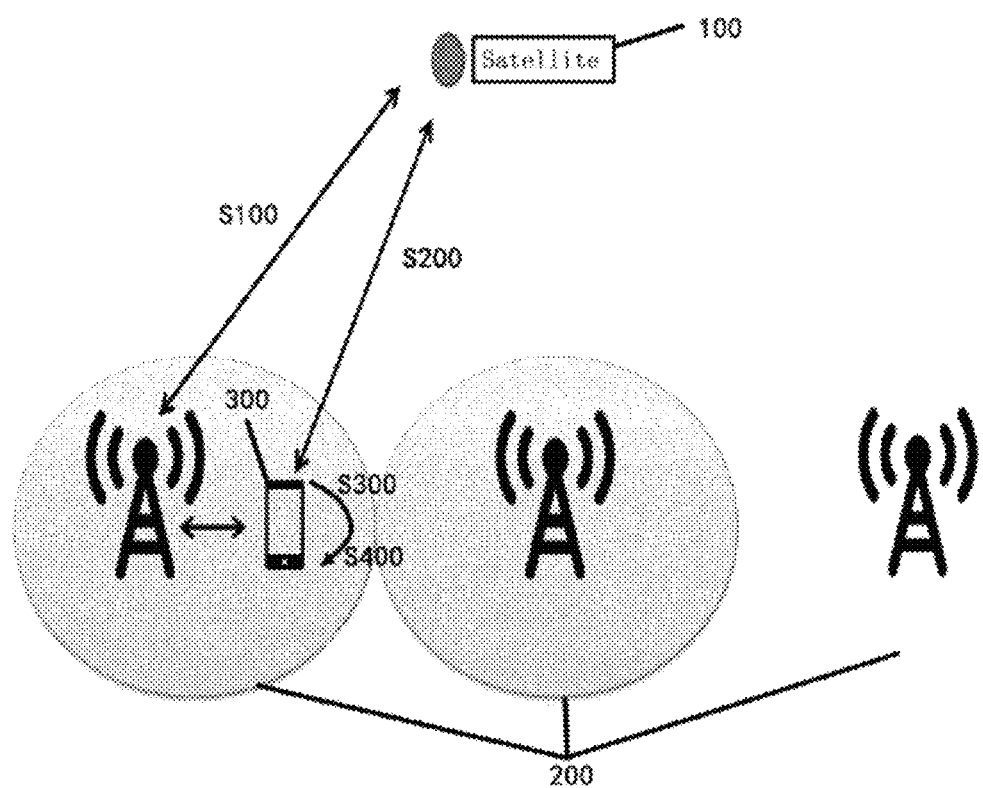
FIG. 3 is a schematic diagram representing the construction of a positioning system based on 5G according to an embodiment of the present invention.

FIG. 3 is a schematic diagram representing the construction of a positioning system based on 5G according to an embodiment of the present invention.

As shown in FIG. 3, the positioning system based on 5G of an embodiment of the present invention comprises a satellite 100, 5G base stations 200, and a user terminal 300. Only 3 base stations are illustrated in FIG. 3. Here the number of 5G base stations is not limited.

Wherein, the satellite 100 is used to provide positioning services, for example, providing initial positioning information for the user terminal 300, and the positioning precision of the initial positioning information is at the meter level.

The 5G base station 200 is used to broadcast positioning calibration information including pseudo-range and phase information, station coordinates, station movement rate vectors, GPS ephemeris, weather data around the station, and the like.

The user terminal 100 is used for calculating according to the initial positioning and calibration information to obtain a final positioning result.

Next, a detailed process of the positioning method implemented utilizing the positioning system based on 5G of an embodiment of the present invention is illustrated.

The positioning method implemented utilizing the positioning system based on 5G according to an embodiment of the present invention comprises the following steps:

Step S100: the 5G base station 200 acquires positioning information from the satellite 100 in real time, and the 5G base station 200 processes the acquired positioning information and broadcast outwards the calibration information (including pseudo-range and phase information, station coordinates, station movement rate vectors, GPS ephemeris, weather data around the station, and the like), here, by way of one example, the so-called calibration information means that the 5G base station 200 itself stores its own precise positioning information, the 5G base station 200 acquires positioning information of the satellite 100 from the satellite 100, and uses the difference of the precise positioning information of the 5G base station 200 itself and the positioning information obtained from the satellite as calibration information;

Step S200: the user terminal 300 obtains initial positioning information from the satellite 100;

Step S300: the user terminal 300 accesses the nearest 5G base station 200 in real time, and monitors and acquires the calibration information broadcasted by the nearest 5G base station 200;

Step S400: the user terminal 300 acquires calibration information from the nearest real-time accessed 5G base station 200, utilizes the calibration information to calibrate the initial positioning information, obtains precise positioning result information, this is because the 5G base stations are densely distributed and cover relatively smaller areas at one 5G base station, in this smaller area, the calibration information of the 5G base station 200 can be used for calibration of the user terminal 300 located in the same area because the distance between the 5G base station 200 and the user terminal 300 are smaller and the precisions are almost the same.

According to the high-precision positioning method and system of an embodiment of the invention, utilizing the ultra dense networking characteristic of 5G as compared to 4G, the CORS base stations can be replaced by multiplexing the 5G base station, and the manufacturing cost of the CORS base station can be reduced. Moreover, there is no further need to establish a specific data center to collect the information of each auxiliary base station for processing. At the same time, the calibration information is no longer acquired by the terminal sending access request to the CORS base station, but instead the calibration information is processed by the 5G base station and broadcasted outwards, and the terminal acquires the calibration information by monitoring. Thus the number of terminals can be processed is no longer dependent on the processing capacity of the data center. Further, since the 5G base station is multiplexed, the cost of precise positioning can be reduced, and the application range can be expanded instead of being limited to being directed only to industry customers any more.

Next, an embodiment of a method and system for applying the high-precision positioning method and system of the present invention to charging of refueling or charging is illustrated.

A charging method for refueling or charging based on 5G positioning of an embodiment of the invention comprises:

Step S1: the vehicle owner issuing a refueling/charging demand through a vehicle control system;

Step S2: the 5G base station acquiring positioning information from the satellite, and the 5G base station processing the acquired positioning information and broadcasting outwards the calibration information (including pseudo-range and phase information, station coordinates, station movement rate vectors, GPS ephemeris, weather data around the station, and the like);

Step S3: the vehicle control system acquiring initial positioning information from the satellite;

Step S4: the vehicle control system monitoring the calibration information broadcasted by the 5G base station of the nearest base station;

Step S5: the vehicle control system calibrating the initial positioning information according to the acquired calibration information to obtain precise vehicle positioning information, i.e. the vehicle control system obtaining precise vehicle positioning information according to the distance between the vehicle and the position where the 5G base station is located;

Step S6: the vehicle control system sending the vehicle positioning information to a positioning server;

Step S7: the positioning server sending the positions of the nearest gas station/charging station to the vehicle control system according to the vehicle positioning information;

Step S9: the vehicle control system positioning to the nearest gas station/charging station according to navigation;

Step S10: the vehicle being automatically matched with the nearest gas station/charging station through 5G base stations, e.g., the vehicle being positioned to the empty and the nearest refueling port/charging pile in the nearest gas station/charging station, and the vehicle control system prompting the vehicle owner of the refueling port number/charging pile number;

Step S11: under the condition that the vehicle reaches the respective refueling port number/charging pile number, achieving matching of the vehicle and the refueling terminal/charging pile;

Step S12: the oil gun/charging pile opening automatically, and the vehicle owner being able to carry out self-service refueling/charging;

Step S13: after refueling/charging is finished, the vehicle owner confirming refueling/charging information on the refueling port/charging pile;

Step S14: the gas station uploading transaction request information such as refueling/charging cost, position, merchant number, and the like, to the background system, and the background system completing the transaction according to the transaction request information.

Wherein, in step S10, the achieving of automatic matching of the vehicle with the nearest gas station/charging station through 5G base stations may be implemented by high-precision positioning utilizing 5G base stations. For example, the following steps may be comprised:

the 5G base station acquiring positioning information from the satellite, obtaining calibration information based on the positioning information, and the 5G base station broadcasting outwards calibration information;

the user terminal acquiring initial positioning information from the satellite;

the vehicle control system accessing the nearest 5G base station in real time, monitoring and acquiring calibration information broadcasted by the nearest 5G base station; the vehicle control system calibrating the initial positioning information according to the calibration information, and obtaining vehicle positioning information;

the vehicle control system sending the vehicle positioning information to the 5G base station; and the 5G base station sending, to the vehicle control system, refueling port/charging pile positioning information of the empty and the nearest refueling port/charging pile in the gas station/charging station that is nearest to the vehicle position.

In addition, as a variation, the process of obtaining the vehicle positioning information in the steps S1-S5 described above is implemented by high-precision positioning utilizing 5G base stations, and, of course, the process may be replaced by, for example: adding information of the position of the transmitting base station in a signal transmitted by the 5G base station, and obtaining precise vehicle positioning information of the vehicle according to the distance between the vehicle and the position where the 5G base station is located.

As described above, with the high-precision positioning by 5G base station, since the 5G base station is capable of achieving centimeter level positioning, it is possible to position the vehicle to the empty and the nearest refueling port/charging pile in the nearest gas station/charging station, thereby bringing great convenience to the vehicle owner and optimizing the user experience of refueling/charging.

The above examples mainly illustrate the high-precision positioning method based on 5G and the high-precision positioning system based on 5G. While only certain embodiments of the present invention have been described, it should be understood by those of ordinary skill in the art that the present invention may be practiced in many other forms without departing from its spirit and scope. Accordingly, the illustrated examples and embodiments are to be considered as illustrative and not restrictive, and the invention may encompass various modifications and substitutions without departing from the spirit and scope of the invention as defined by the appended claims.

What is claimed is:

1. A positioning method based on 5G, the method being implemented by a 5G base station, a satellite and a user terminal, and comprising:
   a broadcasting step of acquiring positioning information of the 5G base station from the satellite by the 5G base station, obtaining calibration information based on the positioning information, and broadcasting outwards the calibration information by the 5G base station;
   an initial positioning step of acquiring initial positioning information of the user terminal from the satellite by the user terminal;
   a monitoring step of accessing a nearest 5G base station in real time, monitoring and acquiring calibration information broadcasted by the nearest 5G base station by the user terminal; and
   a calibration step of calibrating the initial positioning information acquired in the initial positioning step according to the calibration information acquired in the monitoring step by the user terminal to obtain positioning result information,
   wherein in the broadcasting step, the 5G base station uses the difference of the positioning information acquired from the satellite and the positioning information of the 5G base station itself as the calibration information.

2. The positioning method based on 5G of claim 1, wherein,
   the calibration information includes pseudo-range and phase information, station coordinates, station movement rate vectors, GPS ephemeris, and weather data around the station.

3. A non-transitory computer readable medium having stored thereon a computer program, wherein,
   the computer program, when executed by a processor, implements the positioning method based on 5G according to claim 1.

4. A computer device comprising a memory, a processor, and a computer program stored on the memory and executable on the processor, wherein the processor, when executing the computer program, implements the positioning method based on 5G according to claim 1.

5. A positioning system for a positioning method based on 5G, comprising:
- a satellite for providing positioning services;
- a 5G base station for obtaining positioning information from the satellite in real time and obtaining calibration information based on the positioning information, and broadcasting outwards the calibration information; and
- a user terminal for acquiring initial positioning information of the user terminal from the satellite, and for acquiring calibration information broadcasted by the 5G base station, and calibrating the initial positioning information according to the calibration information to obtain positioning result information,
- wherein the 5G base station uses the difference of the positioning information acquired from the satellite and the positioning information of the 5G base station itself as the calibration information.

6. The positioning system for a positioning method based on 5G of claim 5, wherein, the calibration information includes pseudo-range and phase information, station coordinates, station movement rate vectors, GPS ephemeris, and weather data around the station.

7. A vehicle refueling/charging method based on 5G positioning, comprising:
- a first positioning step of obtaining vehicle position information based on 5G positioning by a vehicle control system;
- a first navigation position obtaining step of sending the vehicle positioning information to a positioning server by the vehicle control system, and sending the position of a nearest gas station/charging station to the vehicle control system according to the vehicle positioning information by the positioning server;
- a first navigation step of positioning to the location of the nearest gas station/charging station according to the navigation by the vehicle control system;
- a second positioning step of obtaining the position information of an empty and the nearest refueling port/charging pile in the nearest gas station/charging station based on 5G positioning by the vehicle control system;
- a second navigation step of navigating the vehicle to the nearest refueling port/charging pile according to the position information of the refueling port/charging pile by the vehicle control system, and achieving matching of the vehicle and the refueling terminal/charging pile; and
- a refueling/charging step of achieving refueling/charging at the nearest refueling port/charging pile by the vehicle, wherein the first positioning step comprises:
- the 5G base station acquiring positioning information from the satellite, the 5G base station comparing the acquired positioning information with the position information stored by itself, and using the difference of the positioning information and the position information as a calibration information and broadcasting outwards;
- the vehicle control system acquiring initial positioning information from the satellite;
- the vehicle control system monitoring the calibration information broadcasted by the 5G base station of the nearest base station; and
- the vehicle control system calibrating the initial positioning information according to the acquired calibration information to obtain vehicle positioning information.

8. The vehicle refueling/charging method based on 5G positioning of claim 7, wherein, the second positioning step comprises:
- the 5G base station acquiring positioning information from the satellite, obtaining calibration information based on the positioning information, and the 5G base station broadcasting outwards the calibration information;
- the vehicle control system acquiring initial positioning information from the satellite;
- the vehicle control system monitoring and acquiring calibration information broadcasted by the 5G base station of the nearest base station;
- the vehicle control system calibrating the initial positioning information according to the calibration information, and obtaining vehicle positioning information;
- the vehicle control system sending the vehicle positioning information to the 5G base station; and
- the 5G base station sending, to the vehicle control system, refueling port/charging pile positioning information of an empty and the nearest refueling port/charging pile in the gas station/charging station that is nearest to the vehicle position.

* * * * *